Patented Dec. 9, 1941

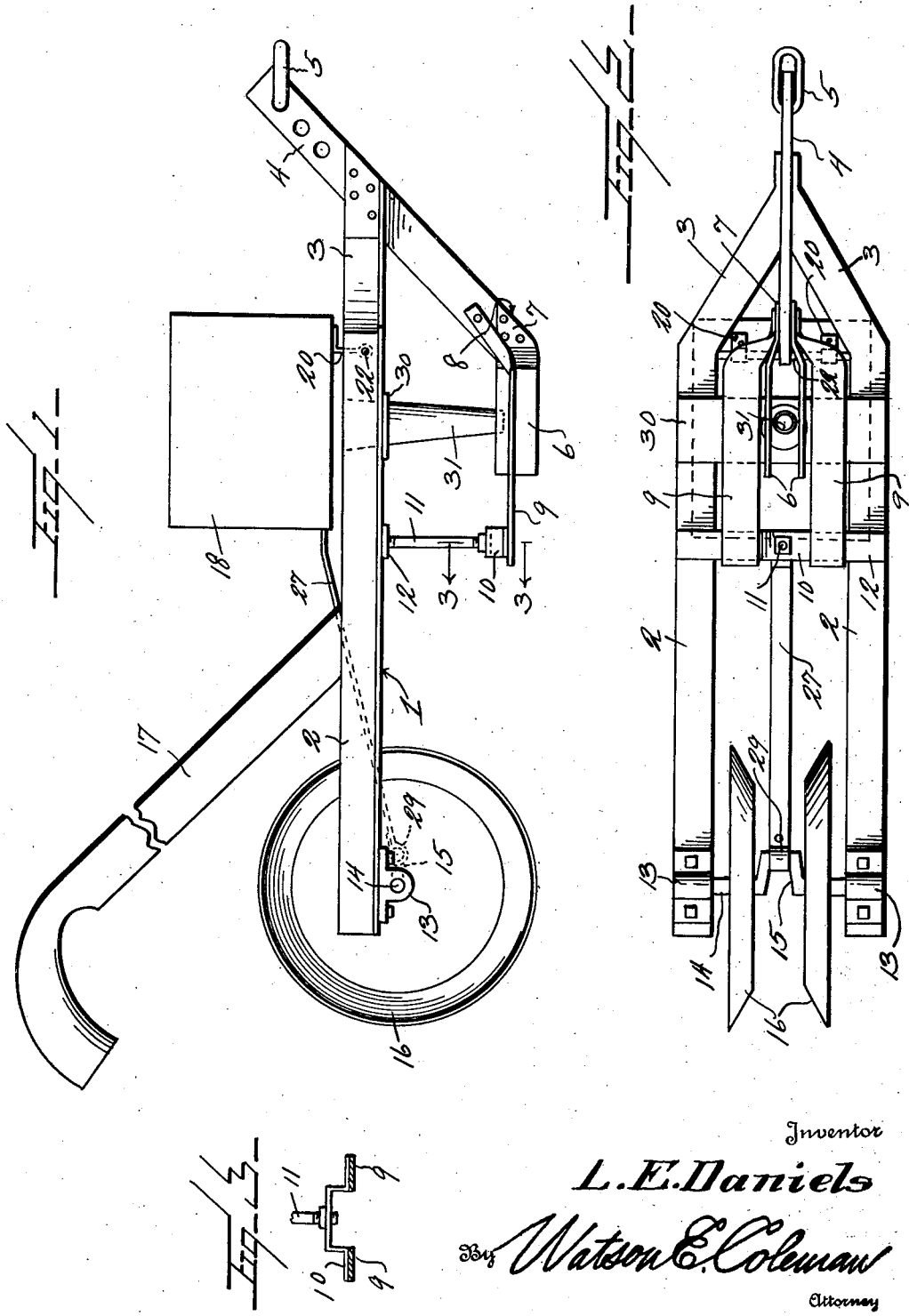

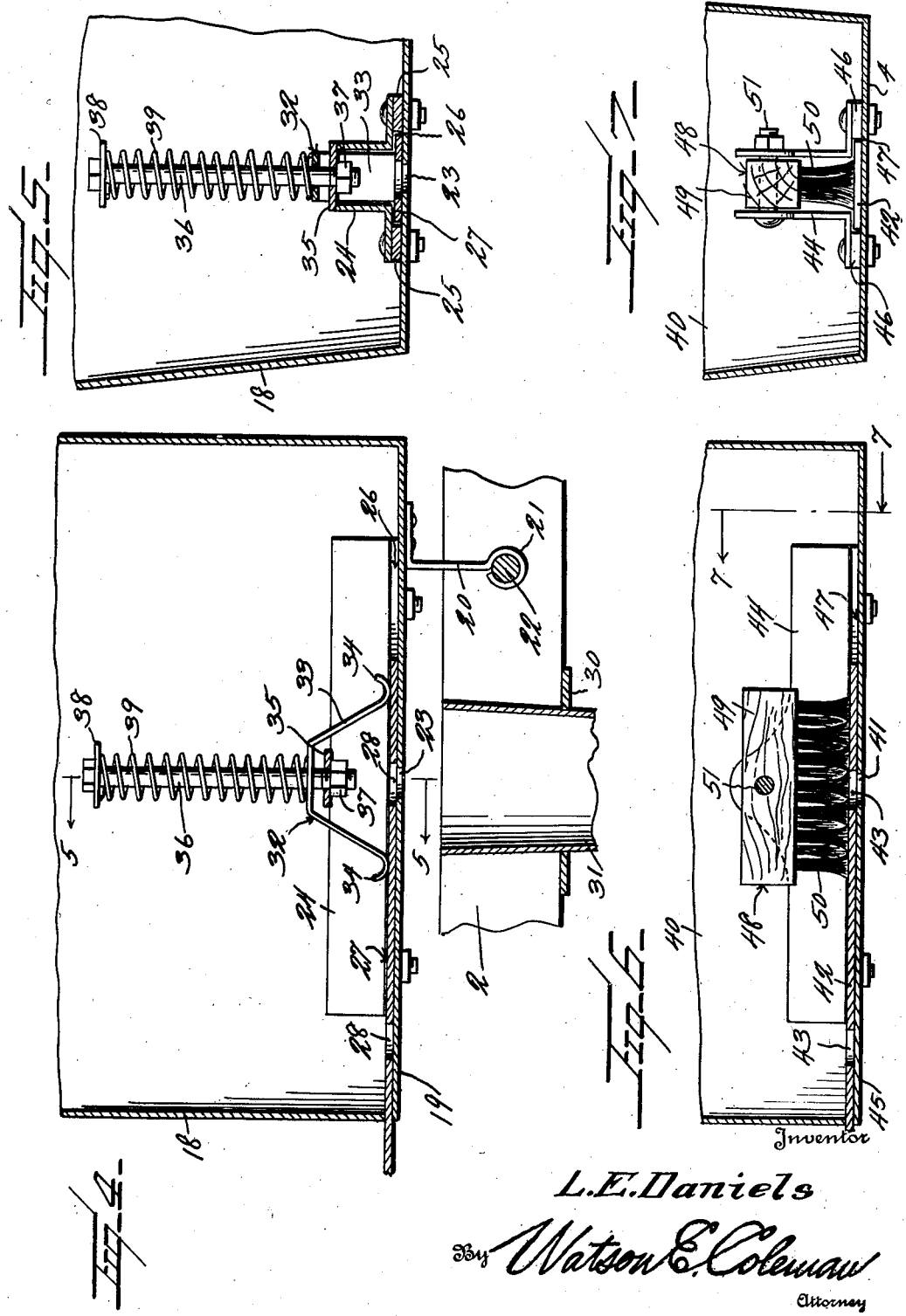

2,265,720

UNITED STATES PATENT OFFICE 2,265,720

SEED PLANTER

Lewis E. Daniels, Amite, La.

Application September 19, 1939, Serial No. 295,668

3 Claims. (Cl. 221—142)

This invention relates to improvements in seed planters and pertains particularly to a novel mechanism for dropping the seed.

The primary object of the present invention is to provide in a seed planter an improved seed dropping mechanism whereby the dropping of single seeds is assured and whereby also the possibility of cracking or injuring the seed as it is removed from the seed receptacle for transfer to the dropping tube, is avoided.

Another object of the invention is to provide in a seed planter a novel means for continuously agitating the seed containing receptacle whereby the constant feeding of seeds to the extractor and dropping mechanism is assured.

Still another object of the invention is to provide in a seed planter, a novel structure associated with means for extracting individual seeds from a mass, whereby, in the event that more than one seed should enter the extractor, they will not be broken or otherwise damaged in passing to the discharge opening of the device.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 is a view in side elevation of the planter embodying the present invention.

Fig. 2 is a view in bottom plan of the same.

Fig. 3 is a section on the line 3—3 of Fig. 1.

Fig. 4 is a fragmentary sectional view taken on a vertical plane through the seed receptacle and extending centrally longitudinally therethrough.

Fig. 5 is a section taken on the line 5—5 of Fig. 4.

Fig. 6 is a sectional view similar to Fig. 4 through a modified form of the receptacle.

Fig. 7 is a sectional view on the line 7—7 of Fig. 6.

Referring more particularly to the drawings, the numeral 1 generally designates a frame which consists of two spaced parallel beams 2 which at one end of the structure are bent to converge as indicated at 3, and are coupled together and upon opposite sides of an interposed upwardly and forwardly extending draft post 4. This post at its upper end is provided with suitable means for attaching the device to a draft machine, such means here being in the form of a coupling ring 5.

At its lower end the post 4 has secured thereto the pair of straight parallel plow blades 6 which, being brought together at their forward ends 7 to form a ground penetrating edge 8, enter the ground to form a furrow in which the seeds may be dropped.

Above the plow blades 6 there are secured to opposite sides of the draft post 4 the rearwardly extending horizontal arms 9 which extend a substantial distance rearwardly beyond the blades 6 and are connected by a cross plate 10. To the central part of this plate 10 there is secured the upstanding post 11, the upper end of which is connected to a cross brace 12 which is connected between the frame beams 2. These arms are disposed in a plane above the bottom edges of the plow blades and operate as depth gauges or depth limiting means for the blades whereby the depth of the furrow formed may be controlled.

At the rear end of each frame beam 2 there is mounted a bearing 13 and between these bearings is supported a shaft 14 which is formed to provide a crank 15 at the longitudinal center of the frame. Upon each side of the crank 15, the shaft 14 carries a beveled wheel 16, the bevel of each wheel being directed toward the longitudinal center of the machine and these wheels are spaced apart the proper distance so that their beveled inner faces will engage against the ridges of earth thrown up by the plow blades 6 in the formation of a furrow and shift such earth ridge inwardly to cover the seeds which have been deposited in the furrow.

Suitable handles 17 are connected with the frame 1 to facilitate guiding the planter.

The numeral 18 generally designates a seed receptacle or hopper. This receptacle has secured to the bottom 19 thereof a bar 20 which is integrally connected with or is itself formed to provide a sleeve 21 which extends transversely of the bottom 19 of the receptacle and is spaced a substantial distance below the same.

The sleeve 21 has extended therethrough a shaft 22 which extends across the frame and is connected between the side beams 2 thereof so that the receptacle is supported for rocking movement on an axis extending transversely of the frame.

The bottom wall 19 of the receptacle is provided with a seed discharge opening 23 and within the receptacle there are disposed the spaced parallel angled guide bars 24. These bars are raised slightly from the bottom 19 by strips 25 so that the adjacent edges of the horizontal flanges will provide in association with the bottom 19, guide channel or slots 26. The other flanges of the angled bars 24 are vertically disposed for the purpose hereinafter described.

The numeral 27 generally designates a flat bar which has one end extended through a suitable opening in the back wall of the receptacle 18 to lie upon the bottom 19 of the receptacle and extend longitudinally of the angle bars 24, having its side edges lying in the guide channels or slots 26. This forward end portion of the bar is provided with the two feed openings 28 which, when the bar is reciprocated across the bottom 19 of the receptacle, alternately pass over the discharge opening 23. The rear end of the bar 27 has a downwardly directed portion terminating in a collar 29 which is connected with the crank 15. Thus it will be seen that as the shaft 14 turns, the crank 15 will impart reciprocatory movement to the feed bar to cause the discharge openings or feed openings 28 to pass back and forth over the discharge opening 23.

Connected with a suitable supporting plate 30 which is secured across the beams 2 of the planter frame, is a feeder funnel 31 which at its upper end is alined with the discharge opening 23 while its lower tapered end positions between the plow blades 6.

In order to insure the entrance into the feeder openings 28 of the feeder bar, of one seed at a time, there is provided a guard means or wiper which is in the form of an inverted substantially U-shaped shield indicated generally by the numeral 32. This shield comprises an elongated plate of relatively broad flat material in which the ends of the side portions or legs 33 are turned back to form contact tips 34. The width of the guard or shield 32 is such that it will fit snugly between the upstanding flanges of the angle bars 24 and the tips 34 rest upon the top of the feeder bar 27. Extending across and connecting the top edges of the angle bars 24 is a plate 35 which passes through the wiper 32, as shown, and extending through the yoke portion of the wiper and through the plate is a bolt 36 which carries a nut 37 upon its lower end, which bears against the underside of the plate 35. Upon the upper end of the bolt 36 is a washer 38 between which and the wiper 32 is an expansion spring 39. This spring normally presses the wiper downwardly so that the tips 34 will maintain firm frictional contact with the surface of the feeder bar 27.

In the operation of the present planter, the same is drawn over the ground, sufficient pressure being brought to bear on the frame through the medium of the handle 17 to cause the plow blades 6 to cut into the earth so as to open a furrow. As the planter is drawn over the ground, rotary motion will be given the covering wheels 16 by reason of their contact with the ground, and this will impart rotation to the axle 14 so as to effect reciprocation of the feed bar 27. As the feed bar moves back and forth in the guides 26, the feeder openings 28 will alternately pass through the area lying between the tips 34 of the wiper shield and over the discharge opening 23. The openings 28 will also alternately move under and from between the tips and as each of the openings 28 passes beneath a tip 34, to move out of the area shielded by the wiper, a seed from the receptacle will enter the opening and as the feeder bar is drawn back into the area between the tips 34 and over the opening 23, the captured seed will drop through the opening 23 into a receiving cone 31 by which it is carried down into the furrow. As previously explained, the opposed beveled faces of the wheels 16, moving along the outer sides of the lines of earth thrown up by the plow blades 6, will force the earth inwardly so as to fill the area which the plow blades have formed, thus covering the seed.

It will be readily apparent from the foregoing that the shielding wiper will function to cause one seed at a time to be taken up by a feeder opening 28 for discharge into the furrow. If, by any chance, two seeds should get into the opening 28, so that neither could lie flat therein and thus be carried smoothly beneath a tip 34, the spring 39 will yield so that the seeds will not be broken or otherwise damaged. This will also occur if one seed should be picked up in a feeder opening 28 in such a manner that it cannot pass smoothly beneath the contact tip.

Fig. 6 illustrates a slight modification of the wiper guard or shield which has been described. In this modified construction only the receptacle is illustrated with a portion of the feeder bar and the modified wiper structure, it being understood that the receptacle will be mounted upon a frame similar to that shown in Fig. 1, so as to be oscillatable thereon and that such frame will carry the covering wheels and crank, the latter being connected with the wiper bar for effecting its reciprocation.

In the modified structure the receptacle is indicated generally by the numeral 40 and the seed discharge opening which is indicated at 41, has extending thereacross the flat feeder bar 42 which is provided with the two feeder openings 43.

Within the receptacle are mounted the spaced parallel angle bars 44, the bottom or horizontal flanges of which are maintained in raised position from the bottom 45 of the receptacle by the strips 46, thus providing the spaced guide grooves 47 in which the longitudinal edges of the feeder bar 42 engage. The feeding of seeds from the receptacle to the discharge opening 41 is controlled by a wiper or shield which consists of a brush member which is indicated generally by the numeral 48 and which comprises a back or body portion 49 which carries the downwardly directed steel bristles 50. This brush is secured by a bolt 51 or in any other suitable manner, which passes through the back 49 and through upstanding ears 52 which are formed integral with the angle bars 44. The tips of the bristles 50 engage the top surface of the feeder bar 42 over the opening 41, and thus it will be seen that as the feeder bar is moved back and forth so that the feeder openings 43 are alternately uncovered so that each may receive a seed, the received seed is drawn in beneath the bristles of the brush until the opening 43 in which it is carried alines with the opening 41, so that it may drop through into the funnel by which it is carried into the furrow. In this operation, the bristles wipe off or prevent from passing to the discharge opening 41 all but the one seed which is trapped in the feeder opening 43, and it will be readily apparent that if two seeds should become wedged in the feeder opening, they may be carried through to the discharge opening 41 without damage as the bristles of the brush are sufficiently yielding to permit this action.

From the foregoing, it will also be readily apparent that the crank 15 serves to not only reciprocate the feeder bar but will at the same time effect an oscillation of the seed receptacle on the supporting cross bar 22, so that the seeds will be constantly shifted in the receptacle and thereby prevented from feeding out only from the central part of the receptacle and leaving piles in the corners which, unless the receptacle were oscillatable, would require that the attendant watch the feeding of the seeds and stir them or spread them over the bottom of the receptacle as the latter becomes emptied.

What is claimed is:

1. In a seed planter, a body, a receptacle mounted upon the body for oscillation on a horizontal axis, the receptacle having a bottom wall provided with a discharge aperture, a pair of spaced parallel members extending along the bottom of the receptacle on opposite sides of said aperture and in a direction transversely to the oscillation axis for the receptacle, an elongated flat plate member disposed upon the bottom of the receptacle between said spaced members and having an aperture for movement over the receptacle aperture, means disposed between the spaced members over the receptacle aperture and engaging the top of said plate for controlling entrance of seed into the plate aperture, crank means carried by the body, and said plate being operatively coupled with said crank means to effect the simultaneous reciprocation of the plate and oscillation of the receptacle on said axis.

2. In a seed planter, a body, a receptacle mounted upon the body for oscillation on a horizontal axis, the receptacle having a bottom wall provided with a discharge aperture, a pair of spaced parallel members extending along the bottom of the receptacle on opposite sides of said aperture and in a direction transversely to the oscillation axis for the receptacle, an elongated flat plate member disposed upon the bottom of the receptacle between said spaced members and having an aperture for movement over the receptacle aperture, means disposed between the spaced members over the receptacle aperture, having divergent flexible elements contacting at their free ends the surface of the plate and yieldable away therefrom for controlling entrance of seed into the plate aperture, crank means carried by the body, and said plate being operatively coupled with said crank means to effect the simultaneous reciprocation of the plate and oscillation of the receptacle on said axis.

3. A seed planter, comprising an elongated frame, a downwardly extending seed conductor attached to the frame, a seed receptacle supported on the frame for oscillation on an axis extending transversely of the frame and having a seed outlet aperture overlying said conductor, an apertured slide member disposed in the bottom of the receptacle and arranged to have the aperture thereof moved into and out of engagement with the discharge aperture of the receptacle, means within the receptacle for controlling the admission of seed to the aperture of the slide member, said slide member having a rigid rearwardly extending portion, crank means carried by the frame, and means coupling said rigid rearwardly extending portion with said crank means for effecting reciprocation of the slide member, the reciprocation of the slide member under the action of the said coupling means also effecting oscillation of the receptacle on its pivot.

LEWIS E. DANIELS.